United States Patent [19]
Miyazawa

[11] Patent Number: 5,907,682
[45] Date of Patent: May 25, 1999

[54] COMMUNICATION LSI FOR RESPONDING TO FUTURE SUPPLEMENTS AND MODIFICATIONS OF THE STANDARD

[75] Inventor: Yuichi Miyazawa, Kanagawa-ken, Japan

[73] Assignee: Kabushiki Kaisha Toshiba, Kawasaki, Japan

[21] Appl. No.: 08/536,959

[22] Filed: Sep. 29, 1995

[30] Foreign Application Priority Data

Sep. 30, 1994 [JP] Japan ................................ 6-261626

[51] Int. Cl.$^6$ .................................................. G06F 15/16
[52] U.S. Cl. ................................ 395/200.6; 395/200.66
[58] Field of Search ............................ 395/200.17, 800, 395/831, 311, 200.67, 86, 200.66, 200.6; 370/17, 54, 60

[56] References Cited

U.S. PATENT DOCUMENTS

| | | | |
|---|---|---|---|
| 5,359,592 | 10/1994 | Corbalis et al. | 370/17 |
| 5,430,715 | 7/1995 | Corbalis et al. | 370/54 |
| 5,619,499 | 4/1997 | Nakabayashi | 370/469 |

FOREIGN PATENT DOCUMENTS

4218207A1  6/1992  Germany.

OTHER PUBLICATIONS

Application Note, The ATM Physical Layer PMC–Sierra, Inc., May 1993, pp. 1–33.
ATM Design Notes, PM7321 PLPP PMC–Sierra Inc., Sep. 1994 p. 1–4.
Mika Lepisto, "ATM Chips and Products", http://www.cs.tut.fi/tlt/stuff/atm/ATM_chips_II.ps.Z Jan. 25, 1995.

*Primary Examiner*—Mehmet B. Geckil
*Attorney, Agent, or Firm*—Foley & Lardner

[57] ABSTRACT

A communication LSI comprises a reception frame disassembling section 1 for receiving data from a network, a reception cell processing section 2 for processing a payload portion of the data disassembled in the reception frame disassembling section and outputting a result thereof to an ATM layer, a reception overhead memory 3 for storing an overhead portion of the data disassembled in the reception frame disassembling section, a receiving processor 4 for executing processes in the overhead portion by inputting desired data stored in the reception overhead memory when data is received, a status register 5 for storing a result processed in the receiving processor, a transmitting processor 6 for executing processes in the overhead portion by inputting the result stored in the status register when data is transmitted, a transmission overhead memory 7 for storing an output of the transmitting processor, a transmission cell processing section 8 for receiving data from an ATM layer, and a transmission frame assembling section 9 for assembling an output of the transmission cell processing section and an output of said transmission overhead memory in a frame and transmitting the frame to a network.

6 Claims, 17 Drawing Sheets

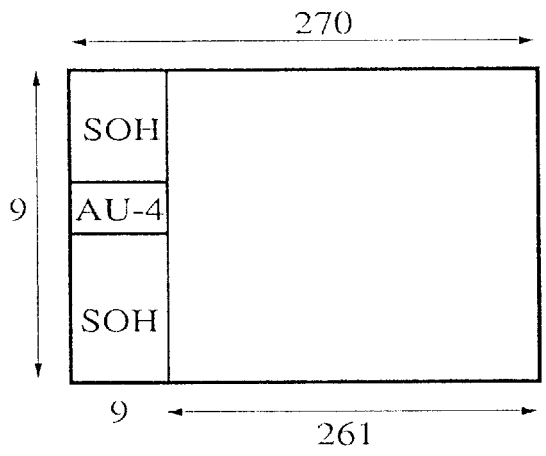
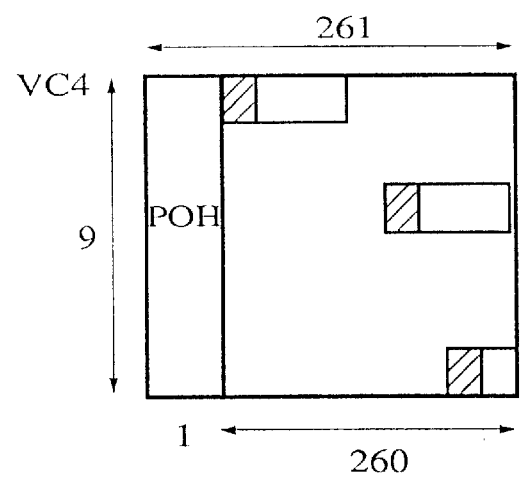

FIG.3A

| PARAMETER | FUNCTION |
|---|---|
| A1,A2 | USED FOR FRAME SYNCHRONIZATION |
| C1 | IDENTIFY EACH STM-1 IN STM-N, OR IDENTIFY EACH STS-1 IN STS-N |
| B1 | INFORM CALCULATION RESULT OF SECTION BIP-8 |
| E1 | (FOR VOICE COMMUNICATION OF TRUNK SECTION IN NNI) |
| F1 | (FOR FAULT IDENTIFICATION OF TRUNK SECTION IN NNI) |
| D1-D3 | (FOR DATA COMMUNICATION OF TRUNK SECTION IN NNI) |
| H1,H2 | INFORM AU POINTER AND P-AIS |
| H3 | PART OF PAYLOAD IS ENTERED BY AU POINTER AT DECREMENT INDICATION |
| B2 | INFORM CALCULATION RESULT OF SECTION BIP-24 |
| K1 | (CONTROL OF SWITCHING SYSTEM IN NNI) |
| K2 | NOTIFICATION OF S-AIS, S-FERF (CONTROL OF SWITCHING SYSTEM IN NNI) |
| D4-D12 | SPECIFY DOMESTIC SPECIFICATION IN RESPECTIVE CONTRIVE |
| Z1 | NOT USED |
| Z2 | S-FEBE (SECTION BIP-24 ERROR NUMBER) |

FIG.3B

| PARAMETER | FUNCTION |
|---|---|
| J1 | MONITOR PATH CONDUCTION |
| B3 | NOTIFICATION OF PATH BIP-8 CALCULATION RESULT |
| C2 | SIGNAL LABEL CODE, FIXED AT 13H IN THE CASE OF ATM |
| G1 | NOTIFICATION OF P-FERF, P-YEL, P-FEBE (PATH BIP-8 ERROR NUMBER) |
| F2 | (MAINTENANCE CHANNEL IN NNI) |
| H4 | CELL OFFSET DISPLAY (DISTANCE FROM FROM THE RIGHT END H4 TO HEAD OF THE FIRST ATM CELL IN BYTE UNIT) |
| Z3 | SPARE |
| Z4 | SPARE |
| Z5 | SPARE |

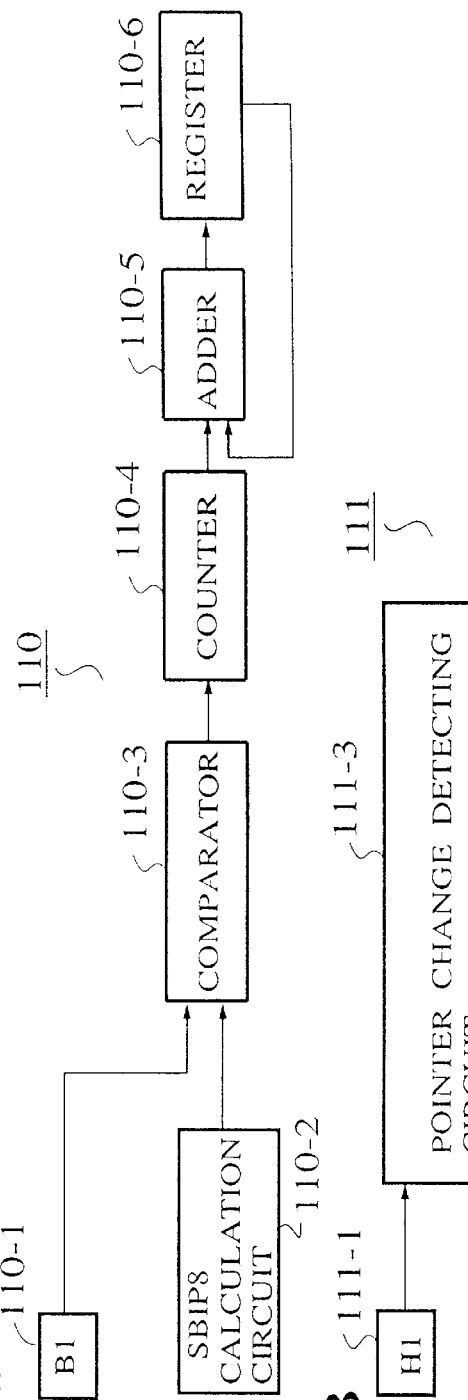
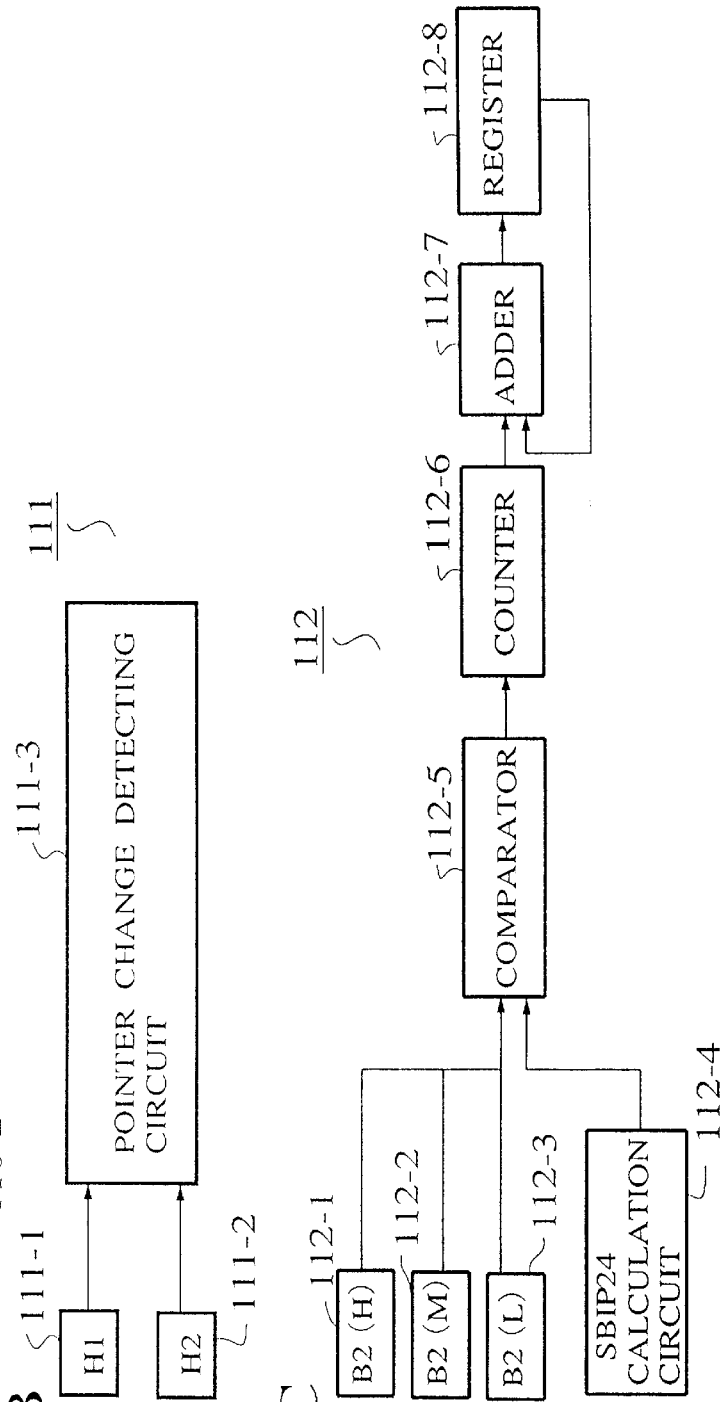
FIG.6A PRIOR ART
FIG.6B PRIOR ART
FIG.6C PRIOR ART

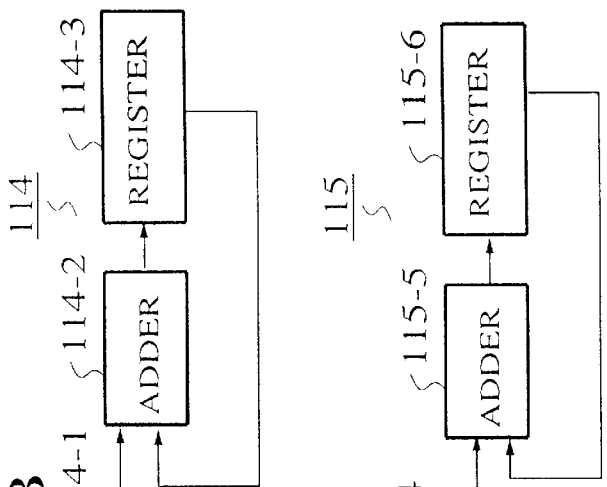
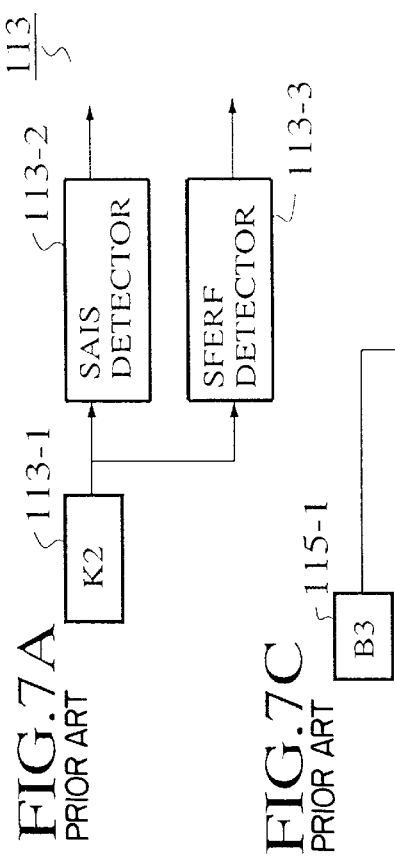
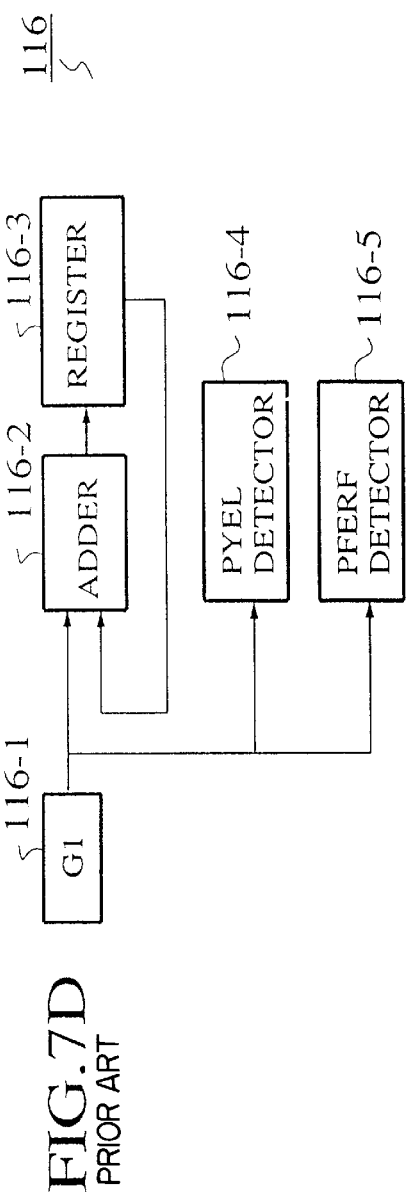
FIG. 7A PRIOR ART
FIG. 7B PRIOR ART
FIG. 7C PRIOR ART
FIG. 7D PRIOR ART

FIG.13

COLUMN ADDRESS

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | A1 | A1 | A1 | A2 | A2 | A2 | C1 | C1 | C1 | J1 | | | LOF_S/R | | B1-SBIP8 | |
| 1 | B1 | — | — | E1 | — | — | F1 | — | — | B3 | | | LOP_S/R | | B2-SBIP24 | |
| 2 | D1 | — | — | D2 | — | — | D3 | — | — | C2 | | | SAIS_S/R | | B3-PBIP8 | |
| 3 | H1 | H1 | H1 | H2 | H2 | H2 | H3 | H3 | H3 | G1 | | | PAIS_S/R | | RX-SFEBE | |
| 4 | B2 | B2 | B2 | K1 | — | — | K2 | — | — | F2 | | | | | RX-PFEBE | |
| 5 | D4 | — | — | D5 | — | — | D6 | — | — | H4 | | | PFERF_S/R | | | |
| 6 | D7 | — | — | D8 | — | — | D9 | — | — | Z3 | | | PYEL_S/R | | | |
| 7 | D10 | — | — | D11 | — | — | D12 | — | — | Z4 | | | | | | |
| 8 | Z1 | Z1 | Z1 | Z2 | Z2 | Z2 | E2 | — | — | Z5 | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

ROW ADDRESS

FIG. 16

|  | \multicolumn{16}{c|}{COLUMN ADDRESS} |
|---|---|---|---|---|---|---|---|---|---|---|---|---|---|---|---|---|
|  | 0 | 1 | 2 | 3 | 4 | 5 | 6 | 7 | 8 | 9 | A | B | C | D | E | F |
| 0 | A1 | A1 | A1 | A2 | A2 | A2 | C1 | C1 | C1 | J1 |  |  |  |  |  |  |
| 1 | B1 | — | — | E1 | — | — | F1 | — | — | B3 |  |  |  |  |  |  |
| 2 | D1 | — | — | D2 | — | — | D3 | — | — | C2 |  |  |  |  |  |  |
| 3 | H1 | H1 | H1 | H2 | H2 | H2 | H3 | H3 | H3 | G1 |  |  |  |  |  |  |
| 4 | B2 | B2 | B2 | K1 | — | — | K2 | — | — | F2 |  |  |  |  |  |  |
| 5 | D4 | — | — | D5 | — | — | D6 | — | — | H4 |  |  |  |  |  |  |
| 6 | D7 | — | — | D8 | — | — | D9 | — | — | Z3 |  |  |  |  |  |  |
| 7 | D10 | — | — | D11 | — | — | D12 | — | — | Z4 |  |  |  |  |  |  |
| 8 | Z1 | Z1 | Z1 | Z2 | Z2 | Z2 | E2 | — | — | Z5 |  |  |  |  |  |  |
| 9 |  |  |  |  |  |  |  |  |  |  |  |  |  |  |  |  |
| A |  |  |  |  |  |  |  |  |  |  |  |  |  |  |  |  |
| B |  |  |  |  |  |  |  |  |  |  |  |  |  |  |  |  |
| C | J1-1 | J1-2 | J1-3 | J1-4 | J1-5 | J1-6 | J1-7 | J1-8 | J1-9 | J1-A | J1-B | J1-C | J1-D | J1-E | J1-F |
| D | J1-10 | J1-11 | J1-12 | J1-13 | J1-14 | J1-15 | J1-16 | J1-17 | J1-18 | J1-19 | J1-1A | J1-1B | J1-1C | J1-1D | J1-1E | J1-1F |
| E | J1-20 | J1-21 | J1-22 | J1-23 | J1-24 | J1-25 | J1-26 | J1-27 | J1-28 | J1-29 | J1-2A | J1-2B | J1-2C | J1-2D | J1-2E | J1-2F |
| F | J1-30 | J1-31 | J1-32 | J1-33 | J1-34 | J1-35 | J1-36 | J1-37 | J1-38 | J1-39 | J1-3A | J1-3B | J1-3C | J1-3D | J1-3E | J1-3F |

ROW ADDRESS

COMMUNICATION LSI FOR RESPONDING TO FUTURE SUPPLEMENTS AND MODIFICATIONS OF THE STANDARD

BACKGROUND OF THE INVENTION

1. Field of the Invention

The present invention relates to a communication LSI and, more particularly, a communication LSI for executing processes of a transmission frame with a physical layer capable of responding flexibly to supplements and/or modifications of standard carried out in future.

2. Description of the Prior Art

A concept for providing services for home such as video on demand, TV shopping, remote medical service, ticket reservation etc. and services for enterprise such as high speed data communication, TV conference etc. by connecting homes, enterprises, public facilities, business facilities, public agencies and the like to each other via high speed communication lines using mainly optical fibers is being advanced. In general, this concept is called as B-ISDN (Broadband Integrated Services Digital Network). Projects for constructing nationwide networks in major countries until early 21st century are also being advanced.

Generally, communication protocols are constituted hierarchically. In B-ISDN, a layered structure is formed by physical layer, ATM layer, ATM adaptation layer, and upper layer in order from the bottom.

The physical layer executes processes of photoelectric conversion, bit synchronization, and transmission frame. The ATM layer executes process regarding ATM cell header. The ATM adaptation layer executes conversion between user data and ATM cell. The upper layer executes protocol processes such as connection establishment and connection release.

Now, SDH (Synchronous Digital Hierarchy) is stipulated as the physical layer of B-ISDN by ITU (International Telecommunication Union). Two types of transmission frames are stipulated in SDH, i.e., STM-1 having a transmission rate of 155.52 Mbps and STM-4 having a transmission rate 622.08 Mbps. An explanation will be given hereinafter using STM-1 having a transmission rate of 155.52 Mbps.

The transmission frame of STM-1 has a structure shown in FIG. 1A. The transmission frame is shown to have 270 bytes in the lateral direction and 9 rows in the vertical direction for easy understanding. Actually, the transmission frame is converted into bit stream sequentially from the first byte located on the left end of the first row to the last bye located on the right end of the last row. SOH and AU-4 pointer are arranged as an overhead in leading 9 columns of the transmission frame. Virtual containers called as VC-4 are arranged in remaining portions. In addition, as shown in FIG. 1B, VC-4 has a structure formed of 261 bytes in the lateral direction and 9 rows in the vertical direction. In VC-4, an overhead called as POH is arranged in a leading first column. In VC-4, portions except for POH are called as "payload" wherein ATM cells of 53 bits are mapped.

Next, FIG. 2A shows an arrangement of parameters stored in SOH and AU-4 shown in FIG. 1A. Functions of these parameters are shown in a table of FIG. 3A. Similarly, FIG. 2B shows an arrangement of parameters stored in POH shown in FIG. 1B. Functions of these parameters are shown in a table of FIG. 3B.

In a user network interface which is supposed as an application field of the communication LSI of the present invention, part of the overheads are used as shown in the table of FIG. 3A. In these tables, "NNI" is an abbreviation for Network Node Interface while User Network Interface is abbreviated to "UNI".

Information handled in the physical layer will be shown hereinbelow for convenience sake of following explanations. These are stipulated in TA-NWT-000253, TR-NWT-001112 both issued by Bellcore, and Recommendation I.432 issued ITU-T.

Fault State

LOS (Loss of Signal)

If no input signal state is continued within a range between $2.3\mu$ sec or more and $100\mu$ sec or less, LOS is declared. If normal synchronization patterns (A1, A2) are detected during two continuous frames and the LOS condition is not fulfilled between their synchronization patterns, the LOS declaration is released. The synchronization pattern is arranged at the head of the frame. In the case of STM-1, the synchronization pattern comprises three A1s (=F6H) and three A2s (=28H), i.e., total 48 bits.

OOF (Out of Frame)

If a synchronization pattern error is generated during four continuous frames, OOF is declared. Even if an error is detected in at least one bit of the 48 bit synchronization pattern in the received frame, it is recognized as the synchronization pattern error. If normal synchronization patterns (A1, A2) are detected during two continuous frames and the LOS condition is not concluded between their synchronization patterns, the OOF declaration is released.

LOF (Loss of Frame)

If the OOF condition is continued during 3 msec, LOF is declared. If the OOF release condition is continued during 3 msec, the LOF declaration is released.

LOP (Loss of Pointer)

If an abnormal pointer is detected N times continuously (where N is an integer within 8 to 10) or if an NDF valid state is detected N times continuously, LOP is declared. Here NDF becomes effective only once at the time of normal operation. If normal NDF is received only once under the LOP state or if a same normal pointer is detected three times continuously, the LOP declaration is released.

LOC (Loss of Cell Delineation)

If a cell header error is detected N times continuously (where N is an integer of about 7), LOC is declared. If a normal cell header is detected N times continuously (i.e., if cell synchronization is established), the LOC declaration is released.

Alarm Signals

Section AIS (Alarm Indication Signal)

In the LOS or LOF state, a section AIS is transmitted. If a fault state of reception is overcome, the section AIS transmission is halted.

Path AIS (Alarm Indication Signal)

If a reception becomes the fault state or if the section AIS is detected in the received frame, a path AIS is transmitted. If the reception becomes a normal state and also the section AIS is not detected, the path AIS transmission is ceased.

Section FERF (Far End Receive Failure)

If the reception is in the LOS or LOF state or if the section AIS is detected in the received frame, a section FERF is transmitted. If the reception fault state is overcome and also the section AIS is not detected, the section FERF transmission is halted.

Path FERF (Far End Receive Failure; PFERF)

If the reception is in any one of the LOS, LOF, LOP and LOC states or if the section AIS or the path AIS is detected in the received frame, a path FERF is transmitted. If the above states are overcome, the path FERF transmission is halted.

Path YEL (Yellow; PYEL)

If the path FERF state is continued during 2 to 10 seconds, a path YEL is transmitted. If the path FERF state is overcome, the path YEL transmission is ceased.

Statistic Information

Section BIP-8 (SBIP-8)

This is the result of calculating exclusive OR (EXOR) over one whole frame every 8 bit. At the time of transmission, this calculation result is input into B1 byte of the succeeding frame. At the time of reception, the calculation result is compared with B1 byte of the succeedingly received frame, and the number of inconsistent bits is counted as the number of error bits.

Section BIP-24 (SBIP-24)

This is the result of calculating exclusive OR (EXOR) over one whole frame (excluding the first to third rows of SOH) every 24 bit. At the time of transmission, this calculation result is input into B2 byte of the succeeding frame. At the time of reception, the number of error bits is counted by comparing the calculation result with B2 byte of the succeedingly received frame.

Path BIP-8 (PBIP-8)

This is the result of calculating exclusive OR (EXOR) every 8 bit over whole VC-4. At the time of transmission, this calculation result is input into B3 byte of the succeeding VC-4. At the time of reception, the number of error bits is counted by comparing the calculation result with B3 byte of the succeedingly received VC-4.

Section FEBE

This indicates the number of error bits of the received frame. The section BIP-24 is calculated for the received frame, then the number of error bits can be derived by comparing this result with B2 byte of the succeeding frame. This is input into Z2 byte of the transmission frame as the section FEBE.

Path FEBE

This indicates the number of error bits of the received VC-4. The path BIP-8 is calculated for the received VC-4, then the number of error bits can be derived by comparing this result with B3 byte of the succeeding VC-4. This is input into G1 byte of the transmission frame as the path FEBE.

Processes in a overhead portion of the frame will be summarized as follows.

Transmission Process

A1: Fixed at F6H.

A2: Fixed at 28H.

C1: Fixed at either value of 01H, 02H and 03H.

B1: The result of the section BIP-8 of the preceding frame is input thereinto.

H1/H2: The pointer value of VC4 is input thereinto. Also, both H1 and H2 are set to FFH at the time of transmission of the path AIS.

H3: Set to FFH at the time of transmission of the path AIS.

B2: The result of the section BIP-24 of the preceding frame is input thereinto.

K2: Its lower three bits are set to 111 at the time of transmission of the section AIS.

Z2: The value of the section FEBE is input thereinto.

J1: Character data of 64 bytes is input cyclically thereinto.

B3: The result of the path BIP-8 of the preceding VC-4 is input thereinto.

C2: Fixed at 13H.

G1: The value of the path FEBE is input into its upper four bits. The value of 1001 is set at the time of transmission of the path FERF. The value 1 is set to the fifth upper bit at the time of transmission of the path YEL.

Incidentally, overhead bytes excluding the above are fixed to OOH.

Receiving Process

A1: Used for frame synchronization.

A2: Used for frame synchronization.

C1: Ignored at the time of reception.

B1: Compared with the result of the parity operation BIP-8 of the preceding received frame to count up the number of inconsistent bits.

H1/H2: The pointer thereof is calculated. In addition, the path AIS is detected.

H3: Used at the time of changing the pointer.

B2: Compared with the result of the parity operation BIP-24 of the preceding received frame to count up the number of inconsistent bits. (This result is input into Z1 byte of the received frame as the section FEBE.)

K2: The section AIS is detected.

Z2: The section FEBE is extracted to be counted up.

J1: Ignored at the time of reception.

B3: Compared with the result of the parity operation BIP-8 of the preceding received virtual container to count up the number of inconsistent bits. (This result is input into G1 byte of the received frame as the path FEBE.)

C2: Ignored at the time of reception.

G1: The path FEBE is extracted from its upper 4 bits to be counted up. Similarly, the path FERF is detected from its upper 4 bits. In addition, the path YEL is detected by checking the fifth bit thereof.

Incidentally, overhead bytes excluding the above are ignored at the time of reception.

Next, referring to FIGS. 4 to 9, a conventional communication LSI for physical layer processing will be explained.

FIG. 4 shows a whole configuration of the conventional communication LSI for physical layer processing. This LSI comprises a reception frame disassembling section 100 for receiving data from a network side, a reception cell processing section 101 for executing predetermined processes to data input from the reception frame disassembling section 100 then outputting a result thereof to an ATM layer, a reception overhead processor section 102 for inputting data from the reception frame disassembling section 100, a status register 103 for inputting data from the receiving overhead processing section 102, a transmission overhead processing section 104 for inputting data from the status register 103, a transmission cell processing section 106 for receiving data from an ATM layer, and a transmission frame assembling section 105 for transmitting to the network data which are supplied from the transmission cell processing section 106 and the transmission overhead processing section 104.

Next, an operation of the communication LSI shown in FIG. 4 will be explained. Data received from the network are classified into an overhead portion and a payload portion by the frame disassembling section 100. The payload portion is sent to the reception cell processing section 101 to be formed as an ATM cell of 53 byte, then sent to the ATM layer. The overhead portion is sent to the reception overhead processing section 102 to extract various information there, and the results thereof are written into the status register 103.

On the other hand, transmission data is input into the transmission cell processing section 106 from the ATM layer in a 53 byte ATM cell fashion, and error-correcting information is attached to the header information. In addition, the transmission overhead processor section 104 determines the content of the transmission overhead byte based on information supplied from the status register 103. The transmission frame assembling section 105 receives overhead data from the transmission overhead processor section 104 and payload data from the transmission cell processing section 106, and then assembles them into the transmission frame so as to send it to the network.

Processing operations of respective portions of the physical layer LSI will be explained in detail individually in a reception system and a transmission system hereinafter.

First, the reception system of the physical layer LSI will be explained.

Like a structure shown in FIG. 5, the reception frame disassembling section 100 comprises a frame synchronization circuit 100-1 for executing synchronization operation based on data received from the network, a frame counter 100-2 for outputting address of currently input data based on an output from the frame synchronization circuit 100-1, a payload display circuit 100-3 for changing output for the cell processing section based on an output from the frame counter 100-2, a register write circuit 100-4 for changing output for the reception overhead processing section based on an output from the frame counter 100-2, and a descrambler 100-5 for outputting data received from the network to the reception cell processing section and the reception overhead processing section.

Next, an operation of the reception frame disassembling section 100 will be explained. A scrambled state of data received from the network is released by the descrambler 100-5. Then the data is output to the reception cell processing section and the reception overhead processing section, and is also output to the frame synchronization circuit 100-1. The frame synchronization circuit 100-1 executes a synchronization operation by detecting synchronization words A1, A2 at the head of the reception frame. The frame counter 100-2 executes a count operation in synchronization with the reception frame under control of the frame synchronization circuit 100-1. The register write circuit 100-4 decodes values of the frame counter 100-2, and generates a pulse for writing a required bytes (B1, B2, etc.) of overhead bytes (A1, A2, C1, . . . ) into a corresponding register in the reception overhead processing section. The payload display circuit 100-3 generates a high level signal if received data is the payload data, and informs the reception cell processing section that cell data is being received.

Subsequently, with reference to FIGS. 6A to 6C and FIGS. 7A to 7D, details of the reception overhead processing section 102 will be explained.

The reception overhead processing section 102 executes processes of the overhead portion after the reception frame disassembling section 100 disassembles received data into the overhead portion and the payload portion. In other words, the reception overhead processing section 102 executes process of the output from the descrambler 100-5 by means of the pulse output from the register write circuit 100-4 of the received frame 1.

An operation of the reception overhead processing section 102 will be explained every overhead byte individually hereinafter.

B1: As shown in FIG. 6A, B1 byte is input into a register 110-1. A SBIP-8 calculation circuit 110-2 calculates the section BIP-8 of the preceding frame in advance. A comparator 110-3 compares 8 bits output from the register 110-1 with 8 bits output from the SBIP-8 calculation circuit 110-2 bit by bit. A different or inconsistent bit indicates a bit error in the preceding frame. A counter 110-4 counts the number of bit errors, and then an adder 110-5 and a register 110-6 accumulate the number of bit errors.

H1/H2: As shown in FIG. 6B, H1 and H2 bytes are input respectively into registers 111-1 and 111-2. A pointer change detecting circuit 111-3 interprets the H1 and H2 bytes, and then determines whether or not the AU-4 pointer should be changed.

B2: As shown in FIG. 6C, B2 byte is input into registers 112-1 to 112-3 (Since the B2 bytes are actually consisted of three bytes, they are discriminated here by adding H, M, L to each byte). A SBIP-24 calculation circuit 112-4 calculates the section BIP-24 of the preceding frame in advance. A comparator 112-5 compares 24 bits output from the registers 112-1 to 112-3 with 24 bits output from the SBIP-24 calculation circuit 110-4 bit by bit. A different or inconsistent bit indicates a bit error in the preceding frame. A counter 112-6 counts the number of bit errors, and then an adder 112-7 and a register 112-8 accumulate the number of bit errors.

K2: As shown in FIG. 7A, K2 byte is input into a register 113-1. The section AIS is detected by a SAIS detector 113-2 which counts the number of cases wherein its lower three bits become equal to 111. The section FERF is detected by a SFERF detector 113-3 which counts the number of cases wherein its lower three bits become equal to 110.

Z2: As shown in FIG. 7B, Z2 byte (although there are three Z2 bytes in one frame, the third Z2 byte from the head is indicated in this case.) is input into a register 114-1. Its lower 7 bits are stored as the section FEBE by an adder 114-2 and a register 114-3.

B3: As shown in FIG. 7C, B3 byte is input into a register 115-1. A PBIP-8 calculating circuit 115-2 calculates the path BIP-8 of the preceding virtual container (VC) in advance. A comparator 115-3 compares 8 bits output from the registers 115-1 with 8 bits output from the PBIP-8 calculation circuit 115-2 bit by bit. A different or inconsistent bit indicates a bit error in the preceding frame. A counter 115-4 counts the number of bit errors, and then an adder 115-5 and a register 115-6 accumulate the number of bit errors.

G1: As shown in FIG. 7D, G1 byte is input into a register 116-1. The value in upper four bits is accumulated as the path FEBE by an adder 116-2 and a register 116-3. The path FERF is detected by a PFERF detector 116-5 which counts the number of cases wherein its upper four bits become equal to 1001. The path YEL is detected by a PYEL detector 116-4 which counts the number of cases wherein its fifth upper bit becomes equal to 1.

As stated above, in the conventional reception overhead processing section 102, processes are executed by customized hardwares provided every process for respective overhead bytes.

Next, the transmission system of the physical layer LSI will be explained.

Referring to FIG. 8, a structure of the transmission frame assembling section 105 will be explained. The transmission frame assembling section 105 comprises a frame counter 105-1 for executing an counting operation, a register read circuit 105-2 for reading contents of desired counter based on the count output from the frame counter 105-1, a payload request display circuit 105-3 for requesting desired cell data based on the count output from the frame counter 105-1, a selector 105-4 for outputting the output of the register read circuit 105-2 and the output of the transmission cell processing section selectively based on the count output from the frame counter 105-1, and a scrambler 105-5 for scrambling the output of the selector 105-4 to then transmit it to the network.

Then, an operation of the transmission frame assembling section 105 will be explained. Responsive to the structure of the transmission frame, the frame counter 105-1 executes a cyclic counting operation having 270 bytes in the horizontal direction and 9 rows in the vertical direction. The register read circuit 105-2 reads the overhead register of the transmission overhead processing section during when the transmission frame is in a period of the overhead portion. The cell data request display circuit 105-3 outputs a signal requesting cell data to the transmission cell processing section during when the transmission frame is in a period of the payload portion. With reference to the frame counter 105-1, the selector 105-4 selects alternatively the output of the register access circuit 105-2 in a transmission period of the overhead portion and the output of the transmission cell processing section 106 in a transmission period of the payload portion. After being scrambled by the scrambler 105-5, the output of the selector 105-4 is sent to the network.

Next, referring to FIG. 9, an operation of the transmission overhead processor section 104 will be explained every overhead byte individually.

A1/A2: At the time of starting the LSI, F6H is set in an A1 register 120 as A1. In addition, 28H is set in an A2 register 121 as A2.

C1: Either 01H, 02H or 03H is set in a C1 register 122. It depends on external available environments that which value is to be selected.

B1: A SBIP-8 calculation circuit 123 calculates the section BIP-8 of the preceding frame in advance, and the result thereof is set to a B1 register 124.

H1/H2: Usually, pointer values are set in an H1 register 125 and an H2 register 126. When the path AIS is transmitted, the values are set by an alarm signal generating circuit 128. At this time, the pointer value is shunted previously to another register.

H3: OOH is input thereinto.

B2(H)/B2(M)/B2(L): The SBIP-24 calculation circuit 129 calculates the section BIP-24 of the preceding frame in advance. The result thereof is set respectively into a B2(H) register 130, a B2(M) register 131, and a B2(L) register 132.

K2: The value generated by the alarm signal generating circuit 128 is set into a K2 register 133.

Z2: The value generated by the alarm signal generating circuit 128 is set into a Z2 register 134.

J1: The value generated by a character code generating circuit 135 is set into a J1 register 136.

B3: The path BIP-8 of the preceding virtual container is calculated by a PBIP-8 calculating circuit 137 in advance, and the result thereof is set into a B3 register 138.

C2: At the time of starting the LSI, 13H is set into a C2 register 139.

G1: The value generated by the alarm signal generating circuit 128 is set into a G1 register 140.

As stated above, in the conventional transmission overhead processing section 104, respective processes of the overhead bytes are executed by customized hardwares, like the reception overhead processing section 102.

In the existing circumstances (as of the year 1994), B-ISDN is in the stage that the standard therefor is being fixed, so that there is a possibility that new overhead bytes shall be defined in future. Under the present condition, some areas in the overhead portion like D1 to D12 may be defined arbitrarily by respective countries. However, as described above, in the conventional physical layer LSI, customized hardwares each having a certain fixed process are used to execute respective processes of the reception and transmission overhead bytes.

Besides, for instance, hardwares such as comparator, counter or the like shown in FIGS. 6A to 6C are provided individually and respectively in respective processing sections. For this reason, the conventional communication LSI has drawbacks described hereinbelow.

1) It cannot respond flexibly to supplements and/or modifications of the standard.

2) It cannot respond to areas of the overhead portion, which may be defined arbitrarily in respective countries.

3) It requires hardwares on a large scale.

In the conventional physical layer LSI, since customized hardwares are provided for every process, the above drawbacks have been caused.

SUMMARY OF THE INVENTION

The present invention has been made in view of the above problems regarding the above conventional communication LSI, and an object of the present invention is to provide a communication LSI capable of responding flexibly to supplements and/or modifications of physical layer standard carried out in future, and reducing a scale of its hardwares.

A communication LSI as a preferred embodiment of the present invention for executing protocol processes of a physical layer in B-ISDN, comprises a memory for storing overhead information, and a processor for executing a program for said protocol processes.

In addition, said processor is changed from a standby state to an active state of predetermined operation in response to an input of a signal in synchronization with frames of said physical layer.

For this reason, since a processor for executing processes of the overhead portion is provided in the communication LSI, a scale of hardwares can be reduced in contrast to the conventional communication LSI using customized hardwares.

In addition, in a communication LSI as still another preferred embodiment of the present invention, said signal in synchronization with said frames of said physical layer is generated in correspondence to each row of said frames of said physical layer, and said program for said protocol processes is defined correspondingly to each row of said frames of said physical layer.

Therefore, since said signal in synchronization with said frames of said physical layer is generated in correspondence to each row of said frames of said physical layer, no particular synchronization signal is required, so that processes can be achieved quickly. Furthermore, since said program for said protocol processes is defined correspondingly to each row of said frames of said physical layer, i.e., since areas which are not defined yet or which may be defined arbitrarily in respective countries can be assured, the communication LSI can respond flexibly to future supplements and/or modifications of the standard.

In addition, in a communication LSI as still another preferred embodiment of the present invention, said processor comprises a receiving processor for executing said program for said protocol processes when a receiving operation is executed, and a transmitting processor for executing said program for protocol processes when a transmitting operation is executed.

Therefore, since there are provided said receiving processor for executing said program for said protocol processes when a receiving operation is executed and said transmitting processor for executing said program for protocol processes when a transmitting operation is executed, processes can be executed at a higher rate than a single processor.

In addition, even if a synchronization clock on the receiving side and a synchronization clock on the transmittig side are different, transmitting and receiving processes can be executed without adjusting them to coincide with each other.

Further, in a communication LSI as still another preferred embodiment of the present invention, said receiving processor section comprises a program counter for holding an address in which an instruction to be executed succeedingly to an instruction which is being executed presently is stored, a program RAM for outputting said instruction stored in said address which is held by said program counter, an instruction register for holding said instruction output from said memory, an instruction decoder for decoding said instruction held by said instruction register, a selector for selecting data from said reception frame disassembling section and said reception overhead memory section, a register for holding data selected by said selector, and an arithmetic section for inputting said data held by said register and processing said data.

Furthermore, a communication LSI as still another preferred embodiment of the present invention for executing protocol processes of a physical layer in B-ISDN, comprises a reception frame disassembling section for receiving data from a network, a reception cell processing section for processing a payload portion of said data disassembled in said reception frame disassembling section, and outputting a result thereof to an ATM layer, a reception overhead memory section for storing an overhead portion of said data disassembled in said reception frame disassembling section, a receiving processor section for executing processes in said overhead portion by inputting desired data stored in said receiving overhead memory section when data is received, a status register section for storing a result processed in said receiving processor section, a transmitting processor section for executing processes in said overhead portion by inputting said result stored in said status register section when data is transmitted, a transmission overhead memory section for storing an output of said transmitting processor section, a transmission cell processing section for receiving data from an ATM layer, and a transmission frame assembling section for assembling an output of said transmission cell processing section and an output of said transmission overhead memory section in a frame, and transmitting said frame to said network.

Besides, in a communication LSI as still another preferred embodiment of the present invention, said receiving processor section or said transmitting processor section comprises a program counter for holding an address in which an instruction to be executed succeedingly to an instruction which is being executed presently is stored, a program RAM or ROM for outputting said instruction stored in said address which is held by said program counter and capable of storing and changing programs for protocol processes, an instruction register for holding said instruction output from said memory, an instruction decoder for decoding said instruction held by said instruction register, a selector for selecting data from said reception frame disassembling section and said reception overhead memory section, a register for holding data selected by said selector, and an arithmetic section for inputting said data held by said register and processing said data.

Therefore, since said program RAM capable of storing and changing programs for protocol processes is provided, a function of responding flexibly to future supplement and/or modifications of the standard by changing contents of the program RAM can be supplied.

In addition, in a communication LSI as still another preferred embodiment of the present invention, said reception overhead memory section stores SOH, AU pointer, and POH in said overhead portion as their structures remain.

Therefore, in case supplements and/or modifications of the standard are carried out in future, not only designers etc. can easily design a new communication LSI to fit in with new standards, but also areas which are not defined yet or which may be defined arbitrarily in respective countries can be assured since SOH, AU pointer, and POH in said overhead portion are stored in said reception overhead memory section with their structures unchanged. As a result, there is provided a function of responding flexibly to future supplement and/or modifications of the standard.

BRIEF DESCRIPTION OF THE DRAWINGS

Other objects and advantages of the invention will be apparent from the following description taken in connection with the accompanying drawings wherein:

FIGS. 1A and 1B are schematic views respectively showing a format of a transmission frame of STM-1;

FIGS. 2A and 2B are schematic views respectively showing an overhead format of the transmission frame of STM-1;

FIGS. 3A and 3B are tables respectively illustrating functions of the overhead portion used in a user network interface;

FIGS. 6A to 6C are block diagrams respectively showing a configuration of a reception overhead processing section of the conventional communication LSI for executing processes of physical layer;

FIGS. 7A to 7D are block diagrams respectively showing a configuration of the reception overhead processing section of the conventional communication LSI for executing processes of physical layer;

FIG. 13 is a table showing data allocation in a reception overhead memory in the communication LSI shown in FIG. 10;

FIG. 16 is a table showing data allocation in a transmission overhead memory in the communication LSI shown in FIG. 10.

DESCRIPTION OF THE PREFERRED EMBODIMENT

There will now be described an embodiment of a communication LSI of the present invention hereinafter with reference to the accompanying drawings.

FIGS. 10 to 17 are views explaining an embodiment of a communication LSI of the present invention.

Figure 4:
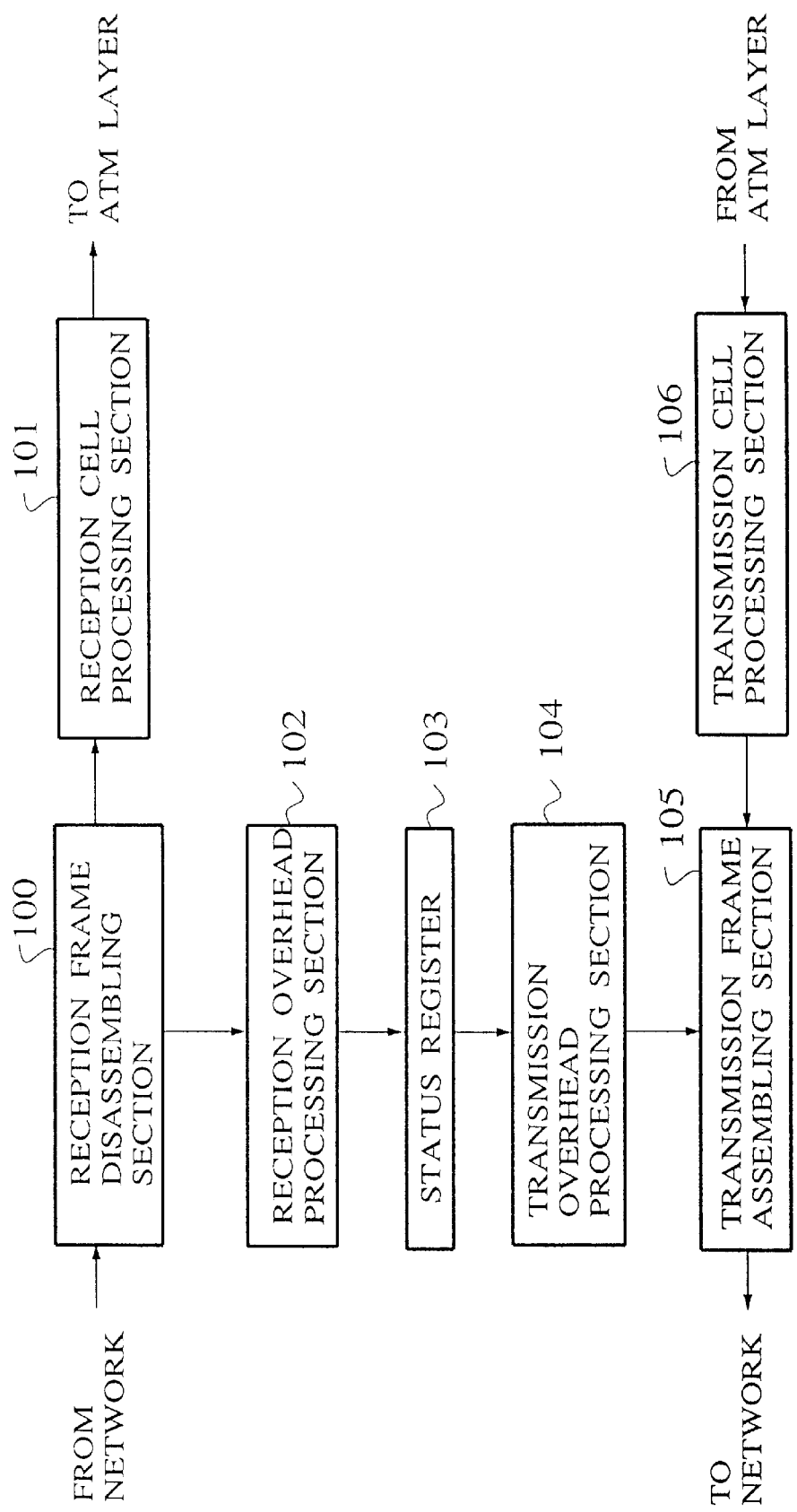
FIG. 4 is a block diagram showing a whole configuration of a conventional communication LSI for executing processes of physical layer.
Figure 5:
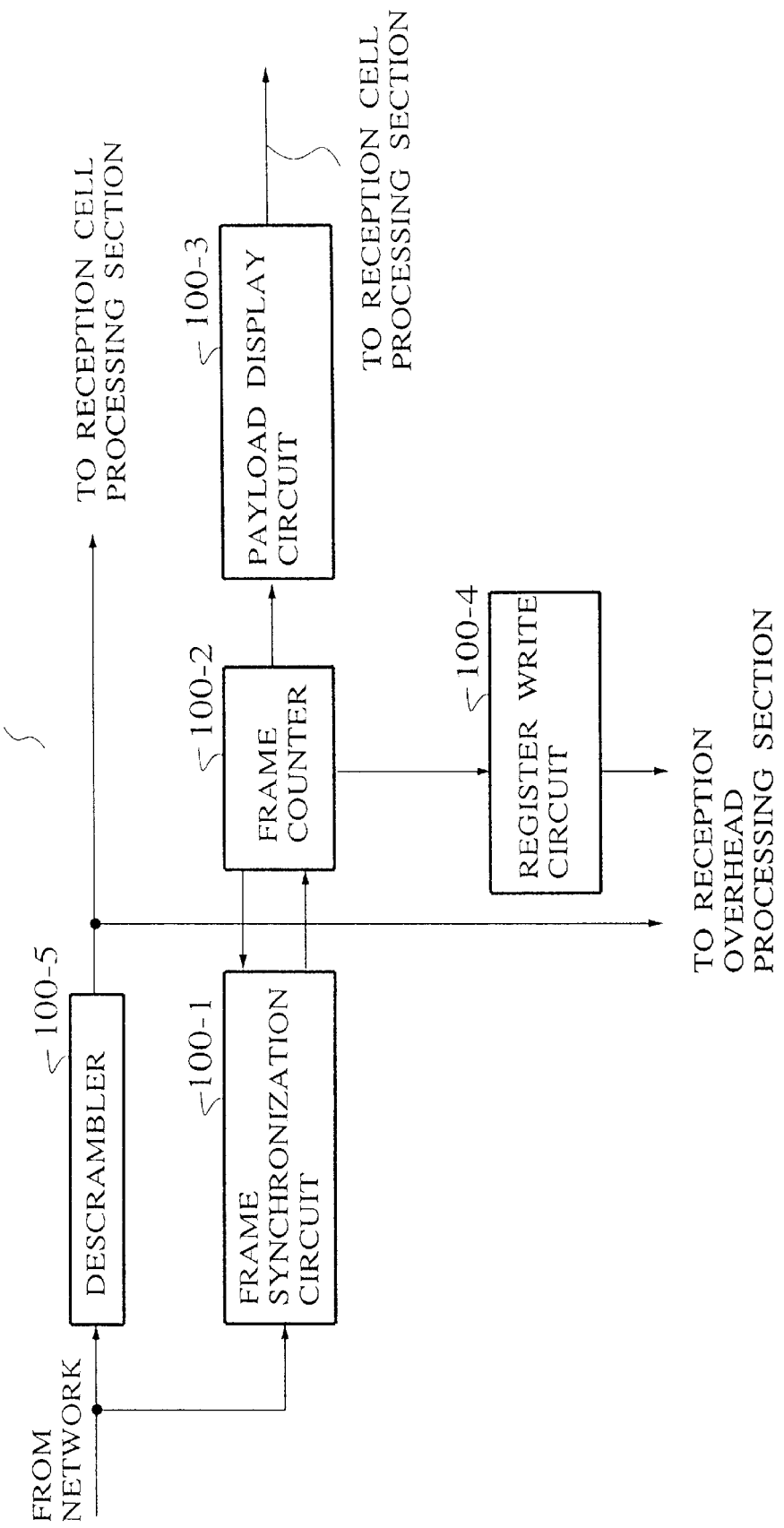
FIG. 5 is a block diagram showing a configuration of a reception frame disassembling section of the conventional communication LSI for executing processes of physical layer.
Figure 8:
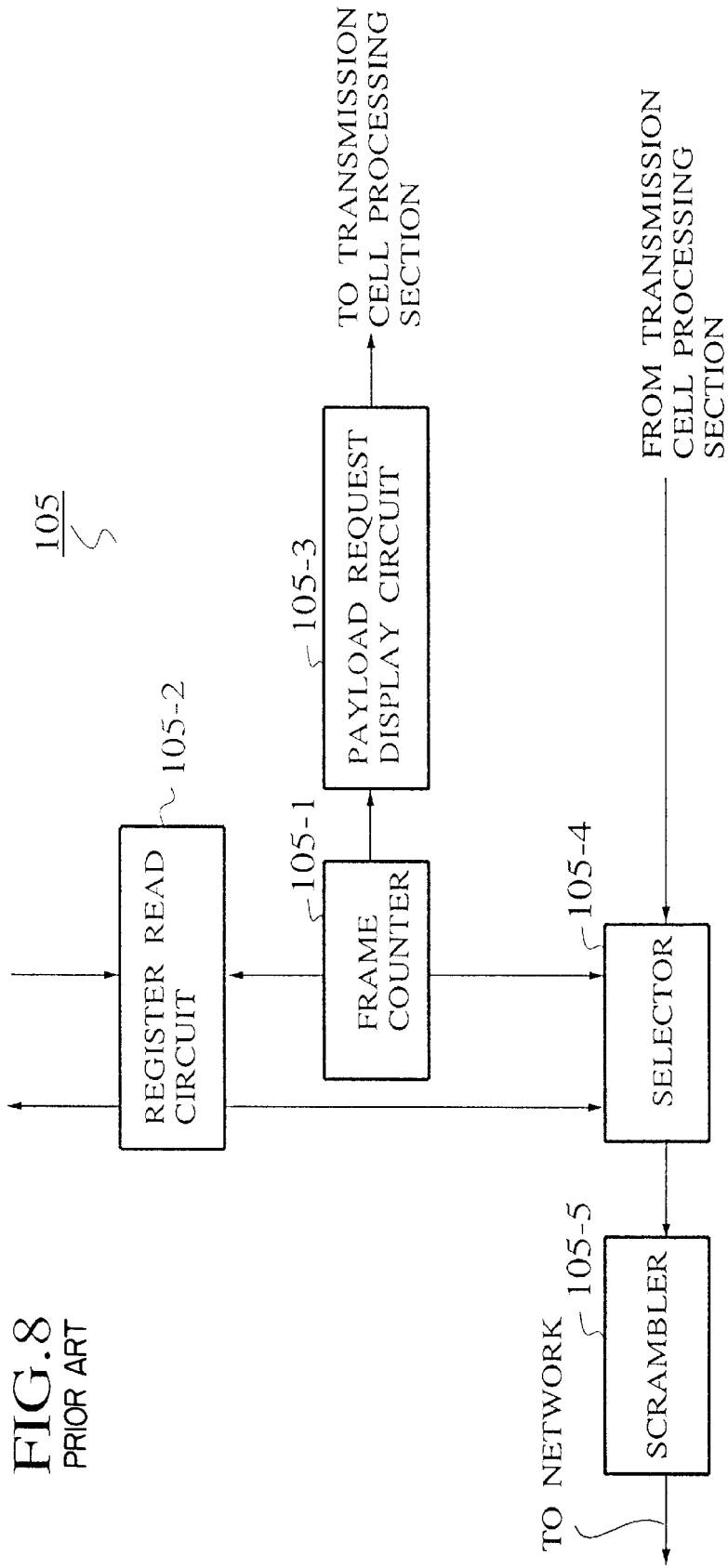
FIG. 8 is a block diagram showing a configuration of a transmission frame assembling section of the conventional communication LSI for executing processes of physical layer.
Figure 9:
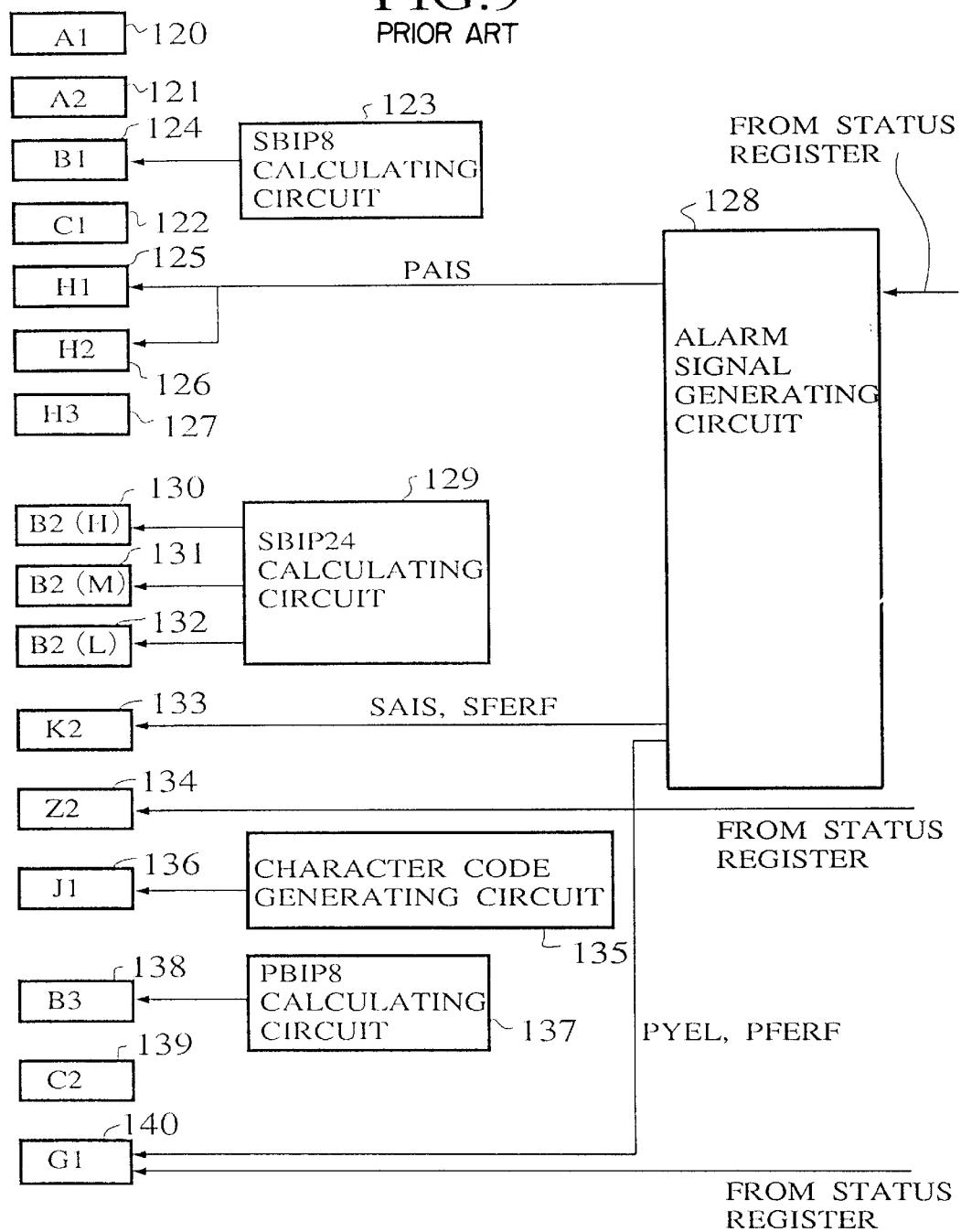
FIG. 9 is a block diagram showing a configuration of a transmission overhead processing section of the conventional communication LSI for executing processes of physical layer.
Figure 10:
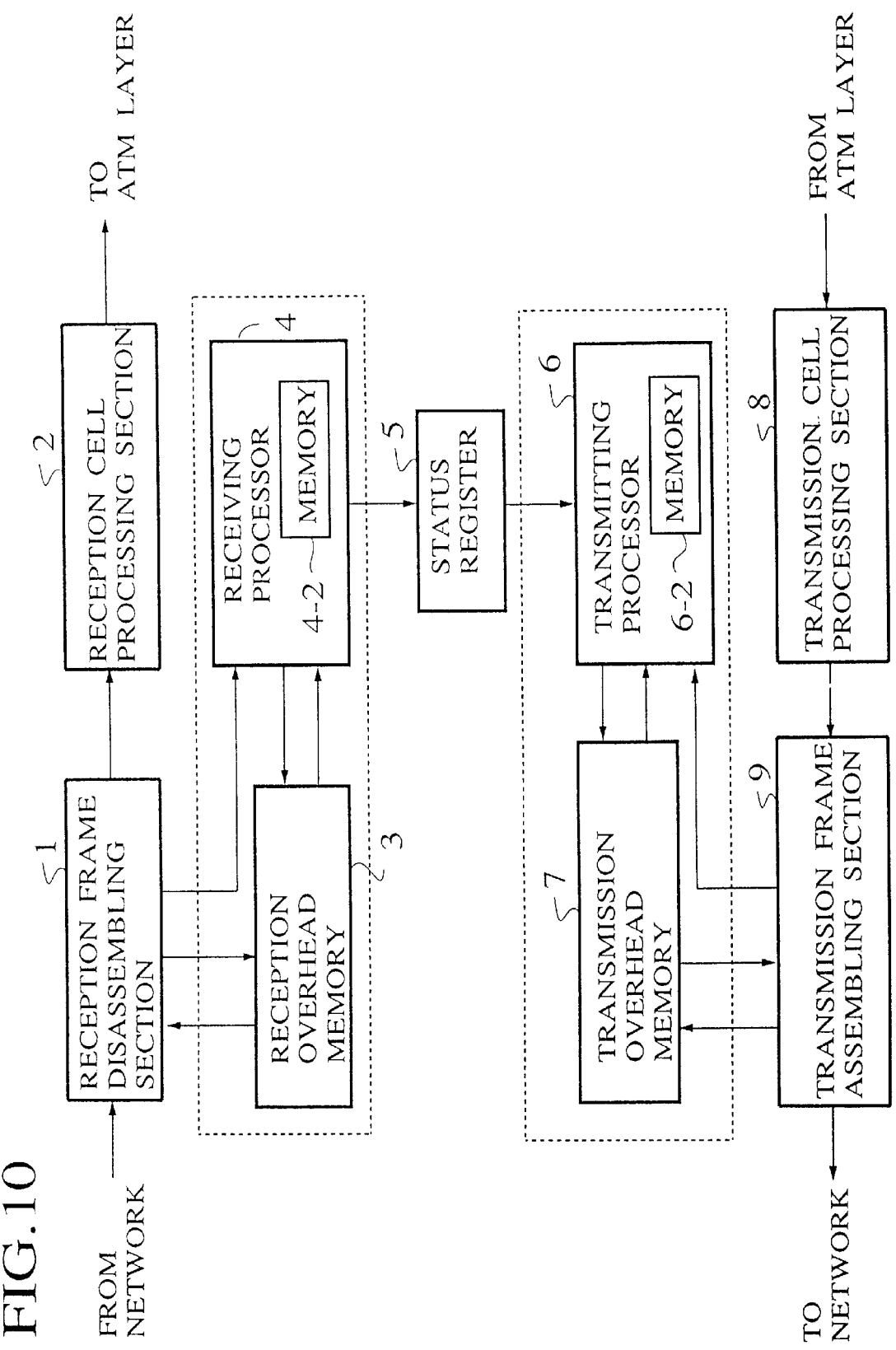
FIG. 10 is a block diagram showing a whole configuration of an embodiment of a communication LSI according to the present invention.

First, FIG. 10 shows a whole block configuration of a communication LSI according to the present invention. This communication LSI comprises a reception frame disassembling section 1 for receiving data from a network, a reception cell processing section 2 for processing a payload portion of the data disassembled in the reception frame disassembling section 1 and outputting a result thereof to an ATM layer, a reception overhead memory 3 for storing an overhead portion of the data disassembled in the reception frame disassembling section 1, a receiving processor 4 for executing processes in the overhead portion by inputting desired data stored in the reception overhead memory 3 when data is received, a status register 5 for storing a result processed in the receiving processor 4, a transmitting processor 6 for executing processes in the overhead portion by inputting the result stored in the status register 5 when data is transmitted, a transmission overhead memory 7 for storing an output of the transmitting processor 6, a transmission cell processing section 8 for receiving data from an ATM layer, and a transmission frame assembling section 9 for assembling an output of the transmission cell processing section 8 and an output of said transmission overhead memory 3 in a frame and transmitting the frame to a network. Process programs used for processing the overhead portion are stored in advance in memories in the receiving processor 4 and the transmitting processor 6. The process programs can be varied so that the communication LSI can respond flexibly to future modifications of the standard. Details thereof are described later.

Next, an outline of an entire operation of the communication LSI shown in FIG. 10 will be explained. Data received from the network are input into the reception frame disassembling section 1 to classify into an overhead portion and a payload portion. The payload portion is sent to the reception cell processing section 2 to be subjected to cell synchronization and cell-header error correction, then sent to the ATM layer. The overhead portion is stored in the reception overhead memory 3 once.

The receiving processor 4 extracts various information from the overhead portion by accessing the overhead memory 3, and predetermined process of the information are gone through. The results thereof are written into the status register 5.

On the other hand, transmission data is input into the transmission cell processing section 8 from the ATM layer in a 53 byte ATM cell fashion. The transmission cell processing section 8 attaches error-correcting information to the cell header, and then sends resultant information to the transmission frame assembling section 9. In addition, the transmitting processor 6 receives status information from the status register 5 to process, and updates overhead byte in the transmission overhead memory 7.

The transmission frame assembling section 9 receives overhead byte from the transmission overhead memory 7 and cell data from the transmission cell processing section 8, and then assembles them into the transmission frame so as to send it to the network.

As has stated above, by effecting processes to be executed in the physical layer by means of the reception processor 4, the transmission processor 6, and overhead memories, an amount of hardwares can be reduced in contrast to the conventional communication LSI employing respective customized hardwares.

Then, detailed operations of respective sections will be explained hereinafter.

Reception Frame Disassembling Section

Figure 11:
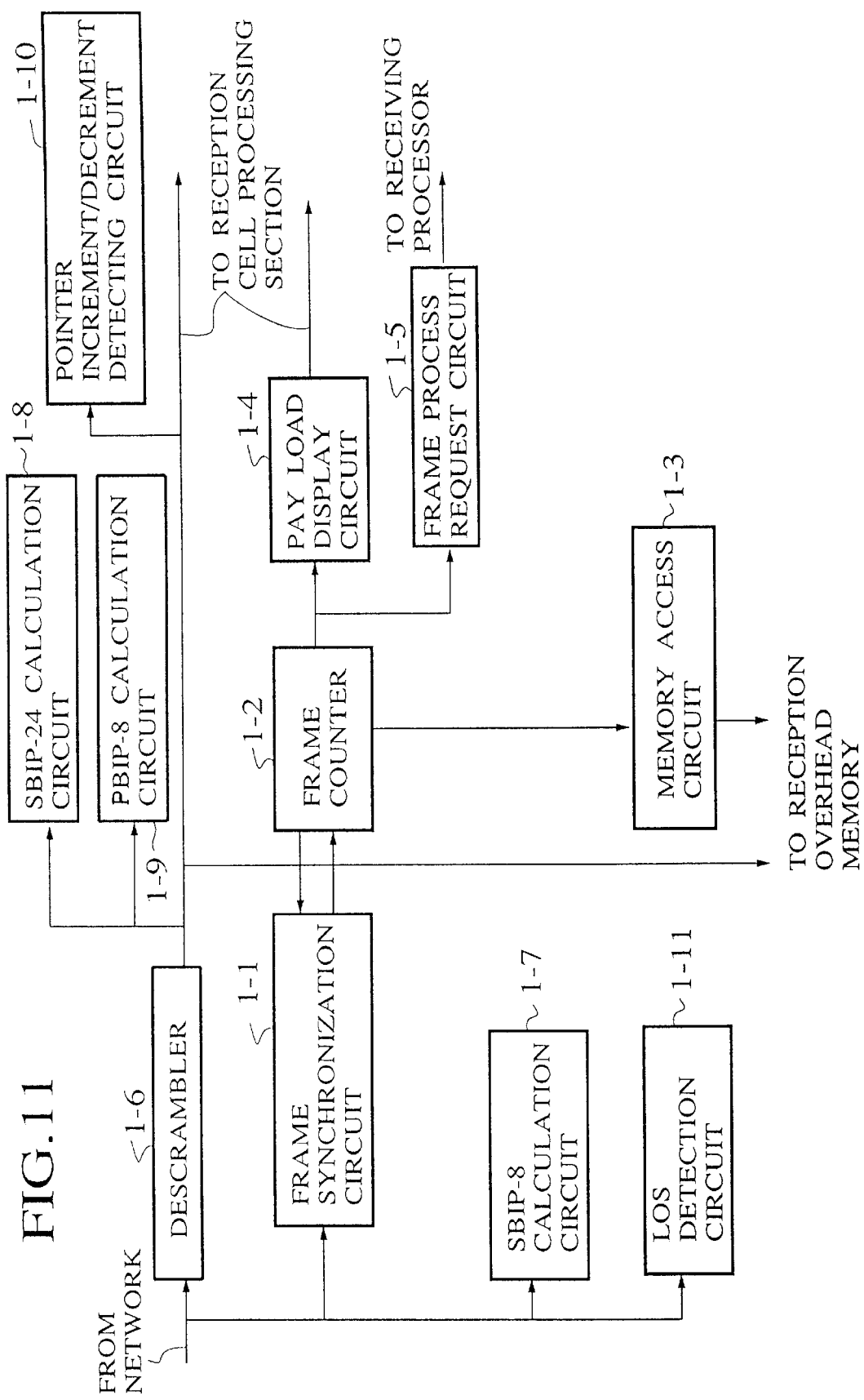
FIG. 11 is a block diagram showing a configuration of a reception frame disassembling section of the communication LSI shown in FIG. 10.

FIG. 11 shows a configuration of the reception frame disassembling section 1. The reception frame disassembling section 1 comprises a frame synchronization circuit 1-1 for executing synchronization operation based on data received from the network, a frame counter 1-2 for executing a count-up operation based on an output from the frame synchronization circuit 1-1, a memory access circuit 1-3 for outputting a control signal to the reception overhead memory 3 based on an output from the frame counter 102, a payload display circuit 1-4 for changing output for the reception cell processing section based on the output from the frame counter 1-2, a frame process request generating circuit 1-5 for outputting a signal requesting process of the overhead portion etc. to the receiving processor 4 based on the output from the frame counter 1-2, a descrambler 1-6 for descrambling data received from the network to output resultant data to the reception cell processing section, a SBIP-8 calculation circuit 1-7 for calculating bit errors included in data received from the network, a SBIP-24 calculation circuit 1-8 and a PBIP-8 calculation circuit 1-9 for calculating bit errors included in the output of the descrambler 1-6, a pointer increment/decrement detection circuit 1-10 for detecting a location of POH in the data output from the descrambler 1-6, and a LOS detection circuit 1-11 for detecting LOS of the signal received from the network.

Then, an operation of the reception frame disassembling section 1 will be explained. First, a scrambled state of data received from the network is released by the descrambler 1-6, and then the data is output to the reception cell processing section. The frame synchronization circuit 1-1 searches synchronization words A1, A2 at the head of the reception frame, and recognizes that a synchronization state has been established if it can detect the synchronization words N times (where N is an integer of about 7) continuously.

Under control of the frame synchronization circuit 1-1, the frame counter 1-2 executes a count operation in the horizontal direction and the vertical direction of the frame starting from A1 byte at the head of the frame in synchronization with the reception frame. According to the value of the frame counter, the memory access circuit 1-3 determines that the overhead byte (e.g. B1) is now being received, and generates a write pulse and a write address so as to store the overhead byte into an appropriate location of the reception overhead memory.

The frame process request generating circuit 1-5 outputs the overhead process request signal and the row number of the frame to the receiving processor at the timing that inputting of the overhead portion is finished within each row of the frame. The payload display circuit 1-4 generates a high level signal to the reception cell processing section only during a payload receiving period.

The SBIP-8 calculating circuit 1-7 calculates the section BIP-8 every frame.

The SBIP-24 calculating circuit 1-8 calculates the section BIP-24 every frame.

The PBIP-8 calculating circuit 1-9 calculates the path BIP-8 every virtual container.

The pointer increment/decrement detecting circuit 1-10 checks H1 byte and H2 byte in the frame overhead portion to determine whether or not a pointer increment/decrement instruction has been sent thereto.

The LOS detecting circuit 1-11 detects that a state wherein no signal is received from the network continues for a certain period (which can be set within a range between 2.3μ sec to 100μ sec).

Cell Processing Section

Figure 12:
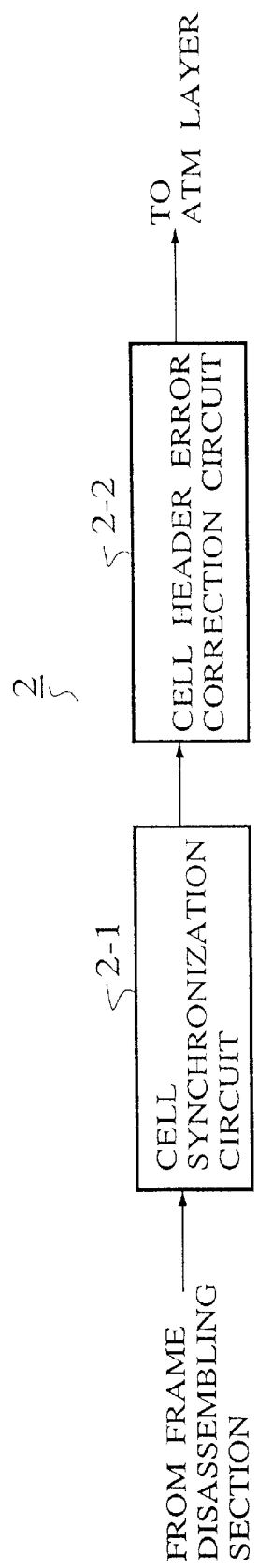
FIG. 12 is a block diagram showing a configuration of a reception cell processing section of the communication LSI shown in FIG. 10.

As shown in FIG. 12, the cell processing section 2 comprises a cell synchronization circuit 2-1, and a cell header error-correcting circuit 2-2.

The cell synchronization circuit 2-1 calculates HEC (Header Error Correction) for continuous four bytes of input data, and then regards that the header has been detected if the result agrees with the fifth byte. If the correct header pattern has been found N times (where N is an integer of about 7) continuously, it can be regarded that the cell synchronization is established. The cell header error-correcting circuit 2-2 performs error correction when one bit error is detected in an HEC calculation.

Reception Overhead Memory

The reception overhead memory 3 stores the overhead portion of the received data, and also serves as a working area when the receiving processor 4 executes process of the overhead portion.

As shown in FIG. 13, the overhead memory stores SOH, AU pointer (H1, H2, H3), and POH.

In addition, areas of this memory to which no valid data is assigned can respond to supplements and/or modifications of the standard enforced after this time, and can also be used as working areas.

In the communication LSI of the present embodiment shown in FIG. 10, working areas are used as shown in the following.

LOF-S/R: Used for detection/release of the LOF.
LOP-S/R: Used for detection/release of the LOP.
SAIS-S/R: Used for detection/release of the section AIS.
PAIS-S/R: Used for detection/release of the path AIS.
SFERF-S/R: Used for detection/release of the section FERF.

PFERF-S/R: Used for detection/release of the path FERF.
PYEL-S/R: Used for detection/release of the path YEL.
B1-SBIP8: Used for counting the number of inconsistent bits between received B1 and SPIP-8.
B2-SBIP24: Used for counting the number of inconsistent bits between received B2 and SBIP-24.
B3-SBIP8: Used for counting the number of inconsistent bits between received B3 and PBIP-8.
RX-SFEBE: Used for accumulating the value of the received section FEBE.
RX-PFEBE: Used for accumulating the value of the received path FEBE.

Now a memory such as Static RAM, for instance, which can be fabricated on a logic LSI and does not need a refresh operation is desirable as the reception overhead memory.

Receiving Processor

Figure 14:
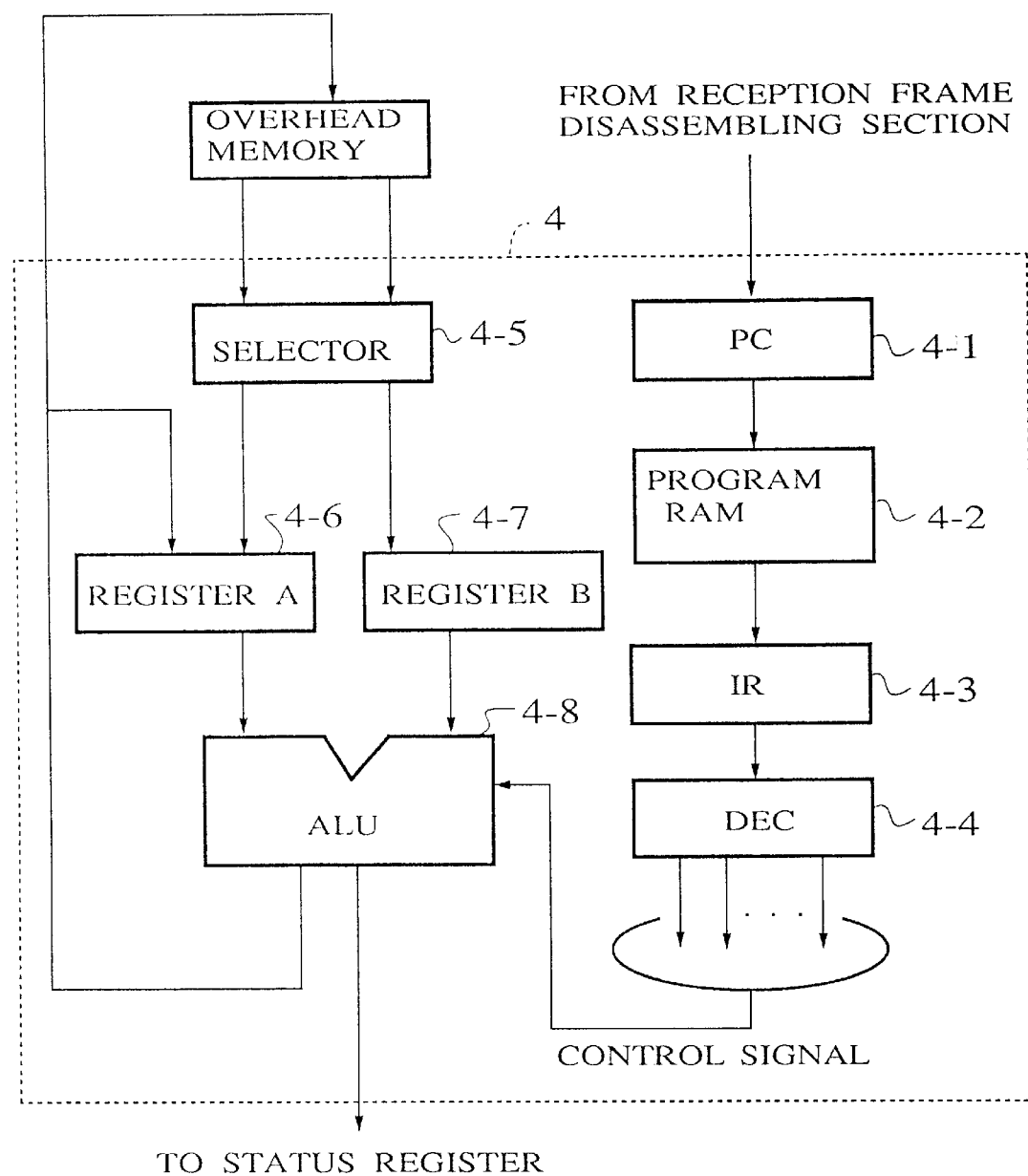
FIG. 14 is a block diagram showing a configuration of a receiving processor of the communication LSI shown in FIG. 10.

As shown by a broken line in FIG. 14, the receiving processor 4 comprises a program counter 4-1 for holding an address in which an instruction to be executed succeedingly to an instruction which is being executed presently is stored, a program RAM 4-2 for outputting said instruction stored in said address which is held by said program counter 4-1, an instruction register 4-3 for holding said instruction output from said program RAM 4-2, an instruction decoder 4-4 for decoding said instruction held by said instruction register 4-3, a selector 4-5 for selecting output from said reception overhead memory section 3, registers 4-6 and 4-7 for holding data selected by said selector 4-5, and an ALU 4-8 for executing various processes of data input according to a control signal from the instruction decoder 4-4 and stored in registers 4-6 and 4-7, and then outputting the result thereof to the status register 5 and the like.

Subsequently, an operation of the receiving processor 4 will be explained. The program RAM 4-2 is read as the contents of the program counter 4-1, and the instruction code read out here is input into the instruction register 4-3, and then is decoded by the instruction decoder 4-4.

Data read out from the reception overhead memory 3 or the status register 5 is input into the registers 4-6 and 4-7 by selecting the selector 4-5.

The ALU4-8 executes arithmetic operation of the data input into the registers 4-6 and 4-7. Actual operation is explained as follows.

The receiving processor 4 is usually in a standby state. The program counter 4-1 indicates a zero address. When the frame process request signal is input from the reception frame disassembling section 1, the number N of rows in the frame received into the program counter 4-1 is set as the jump address. In the N address of the program RAM 4-2, the jump instruction to leading address N of the program to be executed at the N-th row of the received frame is written. The receiving processor 4 goes to the N-th address by this twice jumps, and commences process in the N-th row. The results obtained by a series of the above processes are resulted in the status register 5. When finishing predetermined processes, the receiving processor 4 returns to its standby state.

With the above, since the programs are stored in the program RAM 4-2, the communication LSI can readily respond by changing the program in case the contents of the process are changed and the like.

Status Register

The status register 5 stores status information described hereinbelow.

LOS: Loss of Signal 1 bit
LOP: Loss of Frame 1 bit
LOP: Loss of Pointer 1 bit
LOC: Loss of Cell Delineation 1 bit
SAIS: Section Alarm Indication Signal 1 bit
PAIS: Path Alarm Indication Signal 1 bit
SFERF: Section Far End Receive Failure 1 bit
PFERF: Path Far End Receive Failure 1 bit
PYEL: Path Yellow 1 bit
SFEBE: Section Far End Block Error 7 bit
PFEE: Path Far End Block Error 4 bit

Transmission Processor

Figure 15:
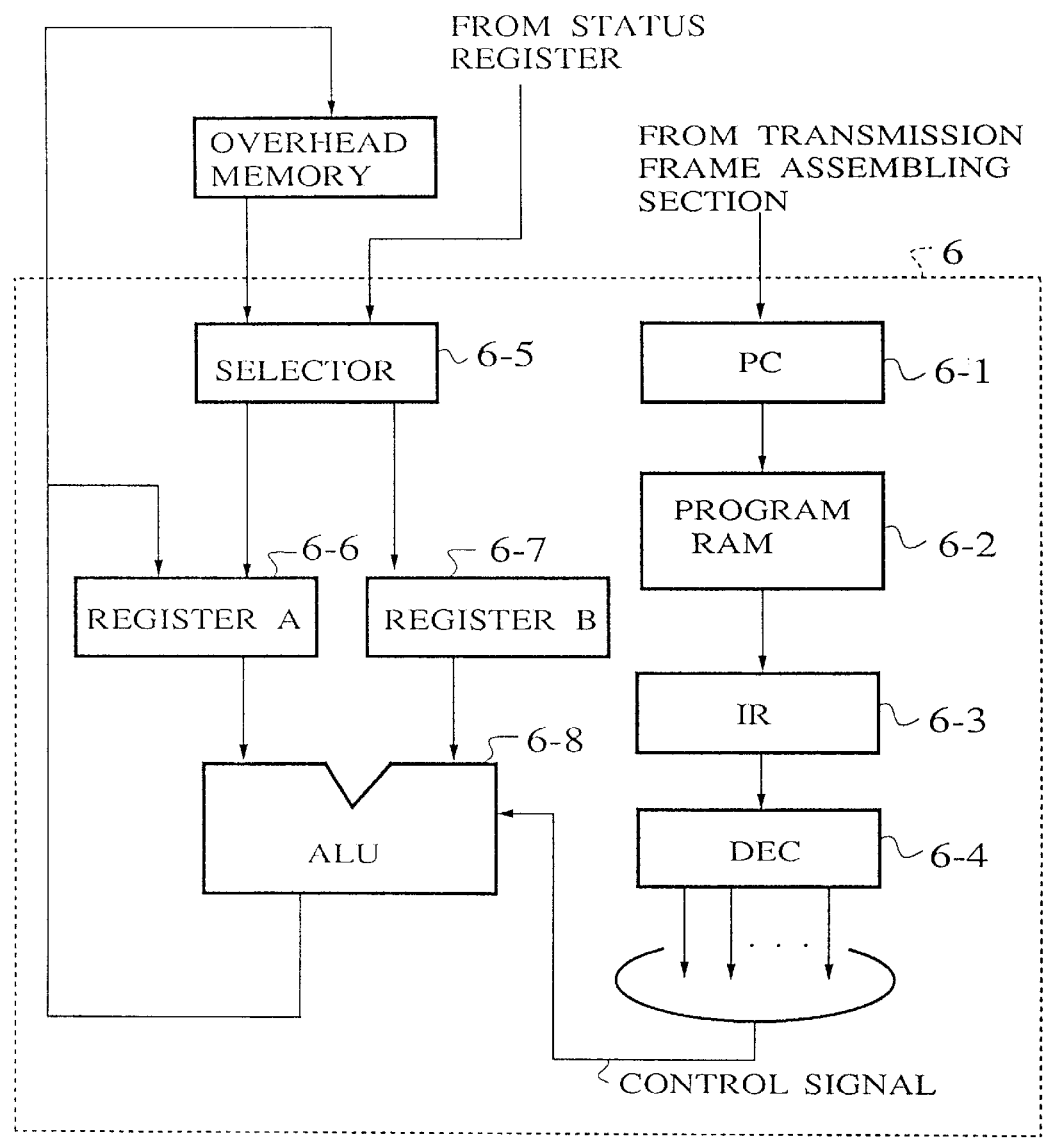
FIG. 15 is a block diagram showing a configuration of a transmitting processor of the communication LSI shown in FIG. 10.

As shown by broken line in FIG. 15, the transmission processor 6 comprises a program counter 6-1 for holding an address in which an instruction to be executed succeedingly to an instruction which is being executed presently is stored, a program RAM 6-2 for outputting said instruction stored in said address which is held by said program counter, an instruction register 6-3 for holding said instruction output from said program RAM 6-2, an instruction decoder 6-4 for decoding said instruction held by said instruction register 6-3, a selector 6-5 for selecting output from said transmission overhead memory 7 and output from said status register 5, registers 6-6 and 6-7 for holding data output from said selector 6-5, and an ALU 44-8 for executing various processes of data stored in the registers 6-6 and 6-7 based on a control signal from said instruction decoder 6-4 and outputting a result thereof to said transmission overhead memory 7 etc.

Subsequently, an operation of the transmitting processor 6 shown in FIG. 15 will be explained.

The instruction code is read from the program RAM 6-2 as the content of the program counter 6-1, then is input into the instruction register 6-3, and then is decoded by the instruction decoder 6-4. Data read out from the status register 5 is written into the registers 6-6 and 6-7.

ALU 6-8 executes arithmetic operation of the data written into the registers 6-6 and 6-7.

Actual operations are discussed as follows. The transmitting processor 6 is usually in a standby state, and the program counter 6-1 indicates zero address. When the frame process request signal is input from the transmission frame assembling section 9, the number N of row of the transmission frame is set in the program counter as the jump address. The jump instruction to the leading address N of the program, which is to be executed at the N-th row of the transmission frame, is written into the N address of the program RAM 6-2. The transmission processor 6 reaches the N-th address by these twice jumps, and starts process of the N-th row. The results derived by a series of processes are input into the transmission overhead memory 7. When predetermined processes are completed, the transmitting processor 6 returns to the standby state.

In the communication LSI of the present embodiment, two processors, i.e., the receiving processor 4 and the transmitting processor 6 are employed. This is because such structure can achieve high speed transmission/reception processes. However, transmission/reception processes can be executed only by one processor.

Transmission Overhead Memory

In the communication LSI shown in FIG. 10, as shown in FIG. 16, the transmission overhead memory 7 stores the overhead portion of received data and J1 code of 64 byte (In FIG. 16, they are stored in CO to FF addresses). Respective overhead byte in the memory may be arranged compactly to secure only an area for storing necessary overhead byte. But, in order to respond to future supplements and/or modifications etc. of the standard, the overhead bytes are arranged such that the overhead structures shown in FIGS. 2A and 2B remain as they are.

A1, A2, C1, H3 and C2 of the overhead portion are set at the time of starting the LSI, and they are not varied thereafter. B1, B2, B3, Z2, J1 and G1 are updated every frame. H1, H2 and K2 are updated at the time of transmission of the alarm signal. All updating of the overhead are executed by the transmitting processor 6. The J1 code arranged from C0H to FFH is set externally at starting the LSI.

Transmission Frame Assembling Section

Figure 17:
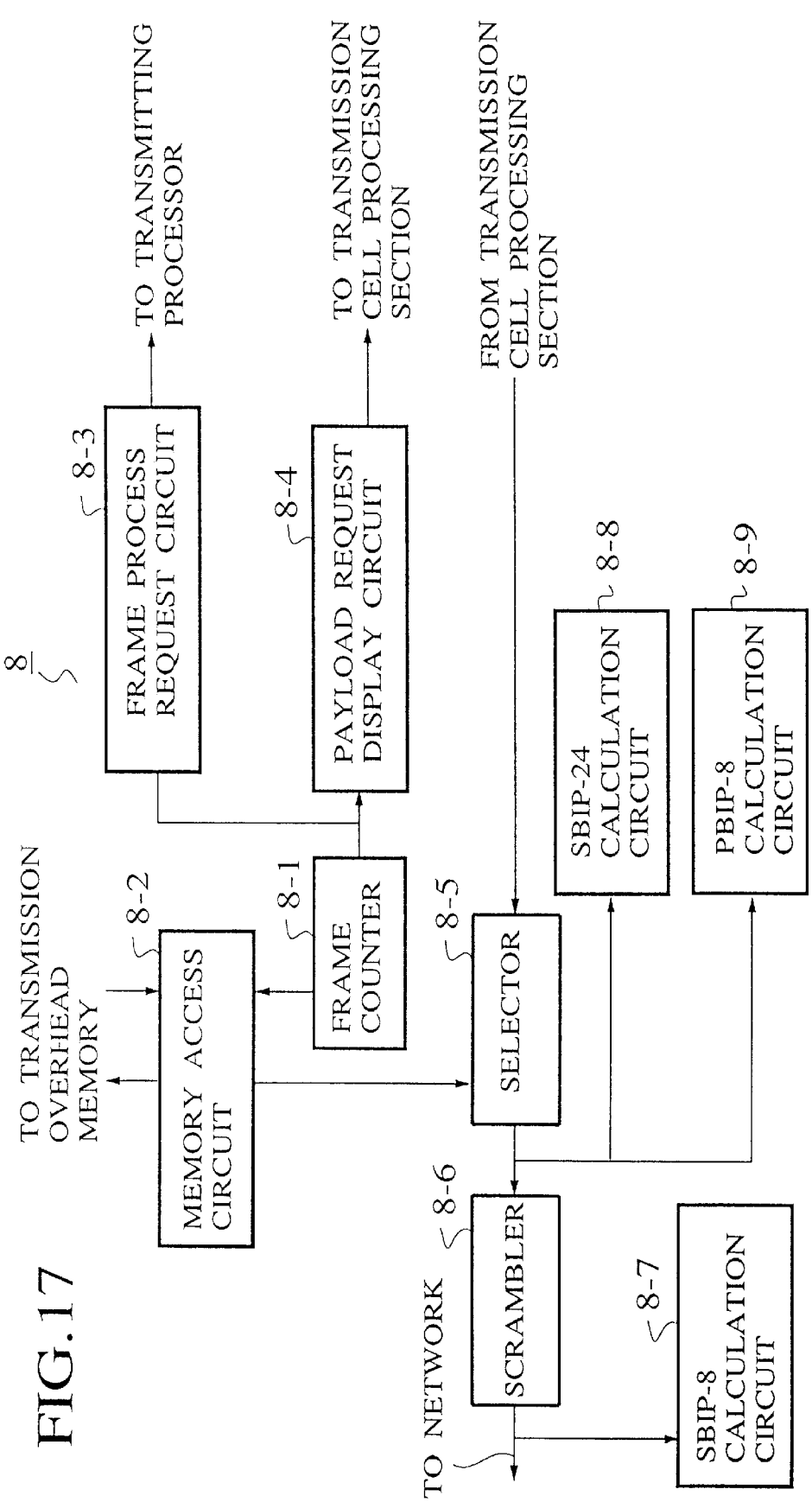
FIG. 17 is a block diagram showing a configuration of a transmission frame assembling section of the communication LSI shown in FIG. 10.

As shown in FIG. 17, the transmission frame assembling section 9 comprises a frame counter 8-1, a memory access circuit 8-2 for fetching data from the transmission overhead memory based on an input of the frame counter 8-1, a frame process request circuit 8-3 for outputting an overhead process request signal etc. to the transmitting processor 6 based on the count output from the frame counter 8-1, a payload request display circuit 8-4 for outputting a cell data request signal to the transmission cell processing section, a selector 8-5 for outputting the output of the memory access circuit and the output of the transmission cell processing section selectively based on the output from the frame counter 8-1, a scrambler 8-6 for scrambling the output of the selector 8-5 to then transmit it to the network, a SBIP-8 calculation circuit 8-7 for calculating bit errors in the output of the scrambler 8-6, a SBIP-24 calculation circuit 8-8 and a PBIP-8 calculation circuit 8-9 for respectively calculating bit errors in the output of the selector 8-5.

Next, an operation of the transmission frame assembling section 8 will be explained.

The memory access circuit 8-2 reads the overhead byte from the transmission overhead memory in synchronization with the output of the frame counter 8-1. The payload request display circuit 8-4 outputs a cell data request signal to the transmission cell processing section 9 during a period when the transmission frame is outputting the payload. Then the transmission cell processing section 9 inputs cell data into the frame assembling section 8.

The selector 8-5 selects the overhead byte and cell data suitably in synchronization with the output of the frame counter 8-1. The scrambler 8-6 scrambles the output of the selector 8-5 to then output the scrambled transmission data to the network. The SBIP-8 calculation circuit 8-7 calculates the section BIP-8 of each frame in the scrambled transmission data. The SBIP-24 calculation circuit 8-8 calculates the section BIP-24 of each frame in the transmission data before scramble. The PBIP-8 calculation circuit 8-9 calculates the path BIP-8 of each virtual container in the transmission data before scramble.

Transmission Cell Processing Section

The transmission cell processing section 8 calculates HEC (Header Error Correction) code of four byte cell header in cell data input from the ATM layer, and inserts the calculated result in the fifth byte to then transmit the transmission data to the transmission frame assembling section 9.

Next, processes of the overhead portion in the embodiment of the present invention will be discussed.

Processes of Overhead Portion at Reception

All overhead bytes of the reception frame are fetched into the reception overhead memory 3.

B1: The SBIP-8 calculation circuit 1-7 calculates the section BIP-8 of the preceding frame in advance. The receiving processor 4 reads the SBIP-8 value from the SBIP-8 calculation circuit 1-7, compares the SBIP-8 value with the B1 value stored in the reception overhead memory 3 bit by bit to count the number of different bits between them, and adds the number into the value of the variable BI-SBIP8 stored in the reception overhead memory 3. The host CPU reads the variable once a second to check performance, and clears the variable simultaneously at that time.

H1/H2: The pointer increment/decrement detecting circuit detects the pointer increment/decrement designation. The reception processor 4 executes validity check of the pointer value, and checks whether or not the same value continues three times sequentially.

B2: The SBIP-24 calculation circuit 1-8 calculates the section BIP-24 of the preceding frame in advance. The receiving processor 4 reads the SBIP-24 value from the SBIP-24 calculation circuit 1-8, compares the SBIP-24 value with the B1 value stored in the reception overhead memory 3 bit by bit to count the number of different bits between them, writes the number into SFEBE of the status register 5, and adds the number into the value of the variable B2-SBIP24 stored in the reception overhead memory 3. The host CPU reads the variable once a second to check performance, and clears the variable simultaneously at that time.

K2: The receiving processor 4 executes detection of SAIS (The number of cases wherein lower three bits become equal to 111 is counted) and detection of SFERF (The number of cases wherein lower three bits become equal to 110 is counted). When SAIS and SFERF are detected, corresponding bits of the status register 5 are set.

Z2: The section FEBE is stored in RX-FEBE of the reception overhead memory 3.

B3: The PBIP-8 calculating circuit 1-9 calculates the path BIP-8 of the preceding virtual container in advance. The receiving processor 4 reads the PBIP-8 value from the PBIP-8 calculation circuit 1-9, compares the PBIP-8 value with the B3 value stored in the reception overhead memory 3 bit by bit to count the number of different bits between them, writes the number into PFEBE of the status register 5, and adds the number into the value of the variable B3-PBIP8 stored in the reception overhead memory 3. The host CPU reads the variable once a second to check performance, and clears the variable simultaneously at that time.

G1: The receiving processor 4 adds the path FEBE into the variable RX-PFEBE of the reception overhead memory 3. The receiving processor 4 counts the number of cases wherein upper four bits becomes equal to 1001 to check an existence of PFERF, and also counts the number of cases wherein the fifth upper bit becomes equal to 1 to check an existence of PYEL.

Processes of Overhead Portion at Transmission

The overhead bytes are transmitted by being set in the transmission overhead memory 7. Location of the transmission overhead memory in which respective overhead bytes are set is determined as shown in FIG. 16.

A1/A2: At the time of starting the LSI, A1=F6H and A2=28H are set in corresponding locations of the transmission overhead memory 7.

C1: Either C1=01H, 02H or 03H is set in a corresponding location of the transmission overhead memory 7. It depends on external available environments that which value is to be selected.

B1: The SBIP-8 calculation circuit 8-7 calculates the section BIP-8 of the preceding frame in advance. The transmitting processor 6 reads the result thereof to set in a corresponding location of the transmission overhead memory 7.

H1/H2: The pointer values are set at the time of starting the LSI. When the path AIS is transmitted, the transmitting processor 6 shunts the pointer value previously to a working area of the transmission overhead memory 7, and then sets FFH in H1 and H2.

H3: 00H is input at starting the LSI.

B2(H)/B2(M)/B2(L): The SBIP-24 calculation circuit 1-8 calculates the section BIP-24 of the preceding frame in advance. The transmitting processor 6 sets the result thereof in a corresponding location of the transmission overhead memory 7.

K2: The transmitting processor 6 checks the status register 5, and sets 111 into lower three bits of K2 byte when the section AIS is transmitted.

Z2: The transmitting processor 6 reads the section FEBE from the status register 5, and sets it in a corresponding location of the transmission overhead memory 7.

J1: As shown in FIG. 7, J1 code of 64 byte is set in the transmission overhead memory 7 at starting the LSI. The transmitting processor 6 reads J1 code sequentially and sets it in a corresponding location of the transmission overhead memory 7.

B3: The path BIP-8 of the preceding virtual container is calculated by the PBIP-8 calculating circuit 8-9 in advance. The transmitting processor 6 sets the result thereof in a corresponding location of the transmission overhead memory 7.

C2: At the time of starting the LSI, 13H is set in a corresponding location of the transmission overhead memory 7.

G1: The transmitting processor 6 checks the status register 5, and sets 1001 into upper four bits of G1 byte of the transmission overhead memory 7 when the path FERF is to be transmitted, and sets 1 into the fifth upper bit of G1 byte when the path YEL is to be transmitted. The transmitting processor 6 reads the path FEBE from the status register 5 and sets it in a corresponding location of the transmission overhead memory 7 when either the path FERF or the path YEL are not to be transmitted.

As explained above in detail, in the communication LSI of the present invention, since the transmitting processor 5 and the receiving processor 4 built in the LSI execute processes of the overhead portion of the frame, a scale of hardwares can be reduced in contrast to the case wherein the conventional communication LSI used for process of physical layer uses customized hardwares for each process, and the process contents are set arbitrarily by the internal program RAM. Therefore, the communication LSI of the present invention can respond to future supplements and/or modifications of the standard as to handling of the overhead bytes, and can process the overhead bytes which may be defined arbitrarily in the standard of respective countries.

In addition, in the above embodiment, the RAM is used as the memory for storing the process program in the transmitting processor 5 and the receiving processor 4, the present invention is not limited to the RAM, and may use ROM, for example. If the ROM is used, the contents cannot be changed by the user after the LSI is shipped out from a factory. However, with respect to production, only the contents of this ROM may be changed if the standard is changed. Therefore, design process etc. can significantly shortened in contrast to the conventional case using customized hardwares.

It should be apparent to those skilled in the art that many changes can be made in the details and arrangements of the steps and parts without departing from the scope of the invention as defined in the appended claims.

What is claimed is:

1. A communication LSI for executing protocol processes of a physical layer in B-ISDN, comprising:

a reception frame disassembling section for receiving data from a network;

a reception cell processing section for processing a payload portion of said data disassembled in said reception frame disassembling section, and outputting a result thereof to an ATM layer;

a reception overhead memory section for storing an overhead portion of said data disassembled in said reception frame disassembling section;

a receiving processor section for executing processes in said overhead portion by inputting desired data stored in said receiving overhead memory section when data is received;

a status register section for storing a result processed in said receiving processor section;

a transmitting processor section for executing processes in said overhead portion by inputting said result stored in said status register section when data is transmitted;

a transmission overhead memory section for storing an output of said transmitting processor section;

a transmission cell processing section for receiving data from an ATM layer; and a transmission frame assembling section for assembling an output of said transmission cell processing section and an output of said transmission overhead memory section in a frame, and transmitting said frame to said network, wherein said receiving processor section comprises:

a program counter for holding an address in which an instruction to be executed succeedingly to an instruction which is being executed presently is stored;

a memory for outputting said instruction stored in said address which is held by said program counter;

an instruction register for holding said instruction output from said memory;

an instruction decoder for decoding said instruction held by said instruction register;

a selector for selecting data from said reception frame disassembling section and said reception overhead memory section;

a register for holding data selected by said selector; and an arithmetic section for inputting said data held by said register and processing said data.

2. A communication LSI according to claim 1, wherein said memory comprises a RAM capable of storing said program for said protocol processes and modifying them.

3. A communication LSI according to claim 1, wherein said memory comprises a ROM.

4. A communication LSI for executing protocol processes of a physical layer in B-ISDN, comprising:

a reception frame disassembling section for receiving data from a network;

a reception cell processing section for processing a payload portion of said data disassembled in said reception frame disassembling section, and outputting a result thereof to an ATM layer;

a reception overhead memory section for storing an overhead portion of said data disassembled in said reception frame disassembling section;

a receiving processor section for executing processes in said overhead portion by inputting desired data stored in said receiving overhead memory section when data is received;

a status register section for storing a result processed in said receiving processor section;

a transmitting processor section for executing processes in said overhead portion by inputting said result stored in said status register section when data is transmitted;

a transmission overhead memory section for storing an output of said transmitting processor section;

a transmission cell processing section for receiving data from an ATM layer; and a transmission frame assembling section for assembling an output of said transmission cell processing section and an output of said transmission overhead memory section in a frame, and transmitting said frame to said network, wherein said transmitting processor section comprises:

a program counter for holding an address in which an instruction to be executed succeedingly to an instruction which is being executed presently is stored;

a memory for outputting said instruction stored in said address which is held by said program counter;

an instruction register for holding said instruction output from said memory;

an instruction decoder for decoding said instruction held by said instruction register;

a selector for selecting data from said reception frame disassembling section and said reception overhead memory section;

a register for holding data selected by said selector; and an arithmetic section for inputting said data held by said register and processing said data.

5. A communication LSI according to claim 4, wherein said memory comprises a RAM capable of storing said program for said protocol processes and modifying them.

6. A communication LSI according to claim 4, wherein said memory comprises a ROM.

* * * * *